Figure 1:
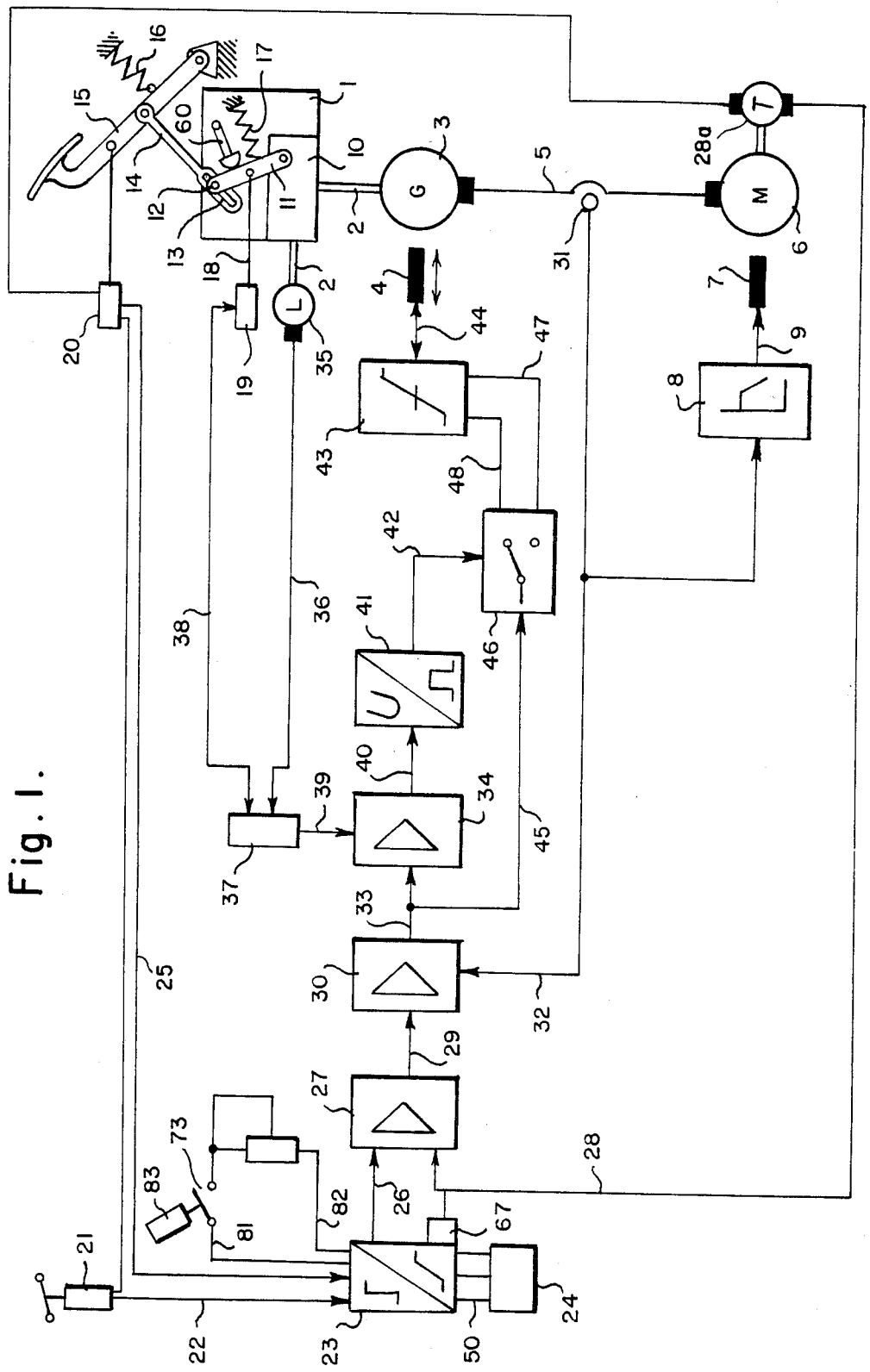

United States Patent [19]

Kremer

[11] Patent Number: 4,524,286
[45] Date of Patent: Jun. 18, 1985

[54] DRIVE UNITS FOR MOTOR VEHICLES WITH INTERNAL COMBUSTION ENGINE ELECTRIC DRIVES

[75] Inventor: Manfred Kremer, Hamburg, Fed. Rep. of Germany

[73] Assignee: Still GmbH, Hamburg, Fed. Rep. of Germany

[21] Appl. No.: 484,309

[22] Filed: Apr. 12, 1983

[30] Foreign Application Priority Data

Apr. 15, 1982 [DE] Fed. Rep. of Germany ....... 3213927

[51] Int. Cl.³ ............................................ B60L 11/12
[52] U.S. Cl. ........................................ 290/45; 290/27; 290/17; 290/14; 318/139; 318/269
[58] Field of Search .................. 290/17, 14, 21, 40 A, 290/40 B, 40 C, 40 D, 40 E, 40 F, 40 R, 51, 45; 318/370, 376, 375, 139, 140, 356, 338, 317; 123/179 A, 179 B

[56] References Cited

U.S. PATENT DOCUMENTS

| | | | |
|---|---|---|---|
| 3,499,164 | 3/1970 | Ferre et al. ........................ | 290/45 X |
| 3,569,809 | 3/1971 | Comer .................................. | 318/338 |
| 3,735,220 | 5/1973 | Renner et al. ....................... | 318/139 |
| 3,745,366 | 7/1973 | Simon ................................. | 290/17 X |
| 3,878,400 | 4/1975 | McSparran .......................... | 290/14 |
| 4,187,436 | 2/1980 | Etienne ............................... | 290/45 X |
| 4,196,377 | 4/1980 | Boxer ................................. | 318/376 X |
| 4,292,531 | 9/1981 | Williamson ........................ | 318/151 X |

FOREIGN PATENT DOCUMENTS 0047499 3/1982 European Pat. Off. .............. 290/45

Primary Examiner—William M. Shoop
Assistant Examiner—Paul Shik Luen Ip
Attorney, Agent, or Firm—Buell, Ziesenheim, Beck & Alstadt

[57] ABSTRACT

Internal combustion engine-electric drive unit for a motor vehicle is provided with a setting means for the travel speed and a signal transmitter for the actual r.p.m. of the output shaft and with a nominal-value integrator, where the running time of the nominal-value integrator is shortened in the case of a desired braking or the like in order to prevent undesirable travel movements due to a divergence of the output of the nominal-value integrator from the actual travel speed after a desired braking.

9 Claims, 2 Drawing Figures

DRIVE UNITS FOR MOTOR VEHICLES WITH INTERNAL COMBUSTION ENGINE ELECTRIC DRIVES

This invention relates to drive units for motor vehicles with internal combustion engine electric drives and particularly to a drive unit for an industrial truck, such as a scoop loader, with an arbitrarily actuatable speed setting adjuster, designed in particular as a pedal, for adjusting the travel speed and with an internal combustion engine, preferably a Diesel engine, in which case its adjusting element and/or the speed setting adjuster is connected with a control signal transmitter and with a separately excited d.c. current generator driven by it and with at least one d.c. motor that is separately excited and fed by the latter, in which case a movement signal transmitting device that gives a signal that is dependent on the state of motion of the d.c. motor is provided, where in addition the signal of the control signal transmitter and the signal of the movement signal transmitting device are fed to a speed regulating unit, whose output signal is fed to a power regulating unit that controls the field excitation of the d.c. generator, in which case the signal of the control signal transmitter is conveyed through a nominal-value integrator, which in a delayed manner modifies the signal flowing to the speed regulating unit in accordance with a prescribed program, to the speed regulating unit. Such a device has already been proposed in German application No. P 30 33 541.2. As a result of the presence of a movement signal transmitter and the switching of its signal to the speed regulating unit, the travel speed at any point in time corresponds to the speed selected with the speed setting adjuster. A travel characteristic thus results, under which the operator can influence the travel speed in a very delicately sensitive manner. By selecting the speed at which the speed setting adjuster moves, e.g., the pedal is depressed, the acceleration is determined, and by backing the speed setting adjuster, e.g., the pedal, a deceleration is also effected. During deceleration the energy flows from the drive wheels to the electric motor connected to it and from the latter to the electric motor connected with the internal combustion engine and through it to the internal combustion engine, which absorbs "drag power" in this operating state. If the nominal-value integrator were not present here, a very high acceleration could be effected by a very sudden change in the adjustment of the speed setting adjuster, e.g., a quite abrupt depression of the pedal, which leads to a jerky movement and high current surges. In order to prevent this and particularly also because operators of vehicles with electric drive are accustomed to having the vehicle slow down when the pedal is backed off, the nominal-value integrator is interposed, which limits the acceleration on the one hand and, on the other hand, with a sudden backing off of the speed setting adjuster into the position assigned to stoppage of the vehicle causes the nominal speed value to back off in accordance with a fixed program, i.e., the travel speed decreases to an extent determined by the nominal value integrator, in which case the integrator can be designed so that the acceleration takes place in accordance with a different program than the deceleration. The nominal-value integrator can also be provided with a setting member, through which either the acceleration program and the deceleration program or each one individually can be adjusted. It is possible here that this adjustability can occur from the driver's seat during operation, or an adjustability can be provided when the vehicle is placed in operation and then remain unchanged. Since the program of the nominal-value integrator influences the driving feel, it has proven more advantageous if the program remains unchanged during operation so that the operator acquires a feel for it and can become attuned to the speed with which the vehicle slows down when he backs off the pedal completely and this travel behavior is not modified during operation, possibly without the knowledge of the operator if another operator has briefly used the vehicle in the interim.

This reduction in the nominal value of the travel speed according to a predetermined program through the nominal-value integrator also takes effect if the travel speed is reduced by actuating an operating brake, e.g., a friction brake, more rapidly than the nominal speed value drops according to the program. This difference between the actual travel speed and the nominal speed value not only has the result that braking must be effected against the drive energy of the vehicle drive and thus with unnecessary energy consumption and brake wear, but also has the result that the actual travel speed is less than the nominal speed value at any point within the time interval, up to the end of which the nominal-value integrator has been regulated down to the nominal speed value of zero. This in turn has the result that if the operating brake is released during such an operating state, the vehicle is again accelerated as a result of the fact that the nominal speed value is higher than the actual speed value. For example, if the vehicle has been braked to a stop with the friction brake and the nominal speed value is still higher than zero as a result of the action of the integrator, the vehicle is again first accelerated to the nominal value upon release of the operating brake and only then slows down in accordance with the program of the nominal-value integrator.

There is an analogous effect if the brake is applied and the pedal actuated at the same time or the vehicle becomes stuck in front of an obstacle, e.g., uneven ground. In this case the nominal speed value runs high in accordance with the nominal-value integrator program, while the vehicle is still stopped dead by the applied brake or the obstacle. Now if the brake is suddenly released or the obstacle is overcome, the nominal speed value, which has already reached a higher level, comes into action in controlling the drive system, with the result that a jerky acceleration occurs.

The invention proposes to avoid the said shortcomings and provide better possibilities for influencing the actual travel speed.

This problem is solved in that the deceleration program of the nominal-value integrator can be influenced arbitrarily or preferably as a function of another operating parameter in the drive system and the nominal-value integrator is provided with an additional device for this purpose.

In one embodiment of the invention the additional device can be a control amplifier that appropriately influences the nominal-value integrator when a difference arises between the signal of the control signal transmitter and the signal of the movement signal transmitter. In the controlled state the control amplifier thus effects a shortening of the residual running time of the nominal-value integrator from the operating point prevailing upon engagement down to the value zero. In another implementation it is provided in a vehicle with an arbitrarily actuatable operating brake that the additional device is influenced by a brake signaller that is dependent on the actuation state of the brake and effects a shortening of the running time of the nominal-value integrator by decreasing its time constant. This means that the nominal-value integrator is connected with a modulating arrangement as the additional device, which can be influenced by the signal of the brake signaller and effects a shortening of the running time of the nominal-value integrator by decreasing its time constant. In this case, the slope of the characteristic curve of the nominal-value integrator is modified by the change in the time constant, i.e., it becomes steeper. The brake signaller can be designed in various ways, e.g., in the case of a hydraulic brake it can be a pressure switch that either acts as an off-on switch when brake pressure develops, or influences a resistance as a function of the degree of brake pressure. However, the brake signaller can also be a pedal-type contact on a brake pedal that closes under the effect of a foot pressure on the pedal, or be similarly designed.

It is particularly advantageous if the two embodiments mentioned above are used jointly.

In another advantageous embodiment of the invention the operating parameter that influences the deceleration program of the nominal-value integrator is the load on the drive axle. The torque is dependent on this axle load and when it is exceeded the peripheral force at the drive wheel results in its rotation ("slip limit"). Through this step of the invention the maximal acceleration and deceleration are controlled as a function of the load and thus of the slip limit. In order to prevent any change in the axle load occurring as a result of vertical acceleration in driving over an irregularity from influencing the nominal-value integrator, in accordance with an additional step of the invention a time-dependent element ("inertia element"), e.g., an additional nominal-value integrator, is interposed. Its response time is selected so that only a persistent change in the load influences the nominal-value integrator, but the time is so short that the operator is not surprised a considerable time after actuating the pedal by a change in the travel behavior. Changes during acceleration and braking are to be taken into account.

Figure 2:
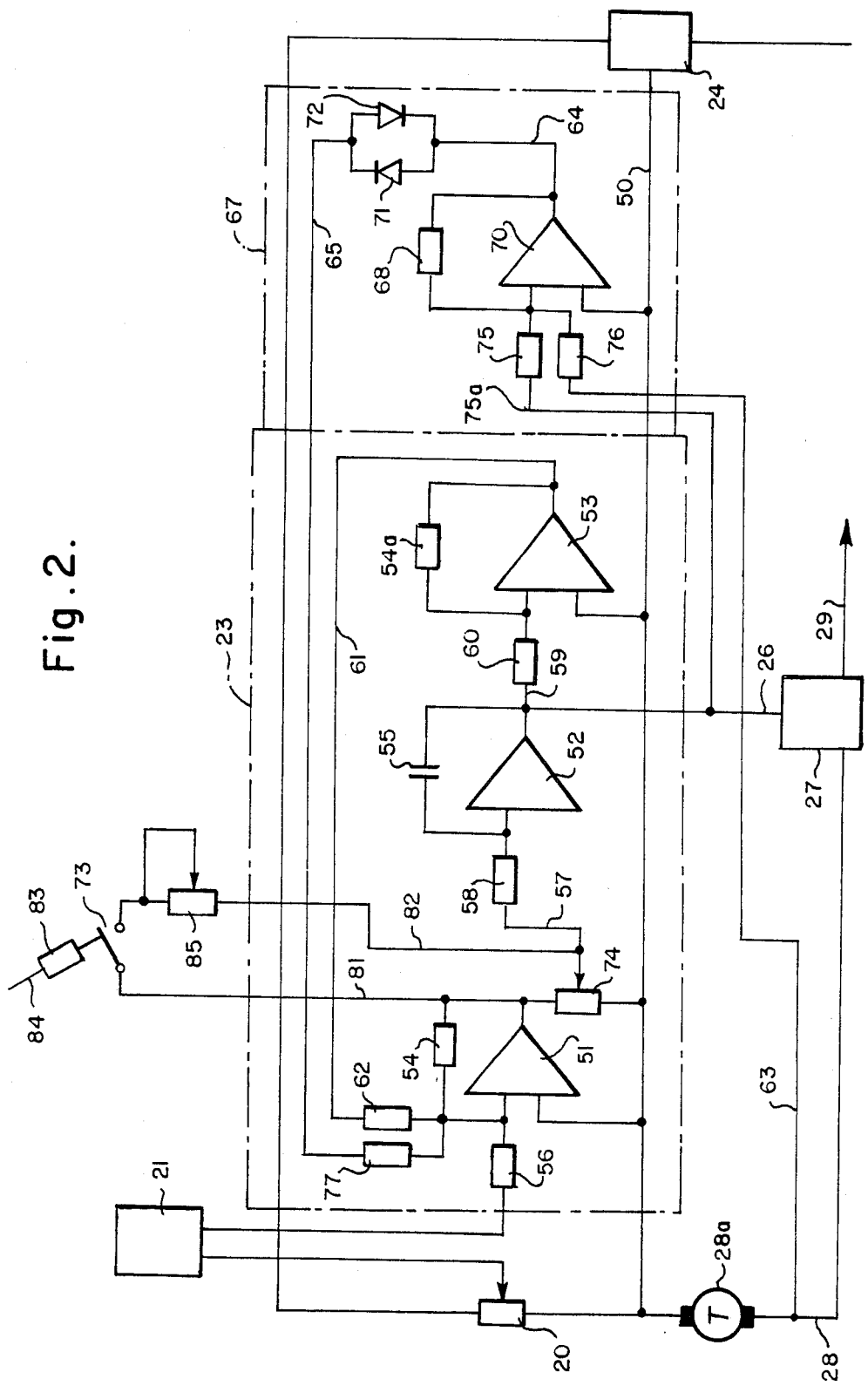

In the foregoing general description of the invention and the prior art, I have set out certain objects, purposes and advantages of this invention. Other objects, purposes and advantages of this invention will be apparent from a consideration of the following description and the accompanying drawings in which:

FIG. 1 shows a circuit diagram for a drive system as a whole according to this invention; and FIG. 2 shows in greater detail the nominal-value integrator and the additional device with the most important assigned components of the drive system.

The internal combustion engine 1 through a shaft 2 drives a d.c. generator with an armature 3 and a field winding 4. The armature current of the d.c. generator 3, 4 is fed through lines 5 to a d.c. motor 6, 7, whose armature 6 is connected to the lines 5, while the current flows from a field current control element 8 through lines 9 to the field winding 7.

In the implementation example the internal combustion engine 1 is a Diesel engine, which is provided with an adjusting element in the form of an injection pump 10, which in turn is connected with an adjusting lever 11, which has at its end a bolt 12, which is carried in an elongated hole 13 of a linkage rod 14 with some play. The rod 14 is connected with the foot pedal 15, which is drawn upward by a spring 16, while the adjusting lever 11 is drawn upward by a spring 17. The adjusting lever 11 is connected through a rod 18 with an adjusting signal transmitter 19. The pedal 15 is connected with a speed setting adjuster 20.

The travel direction indicator 21 is provided for selecting the travel direction. Its signal is conveyed through lines 22 to a nominal-value integrator 23, which is connected through a wiring system to a voltage source 24.

The signal of the speed setting adjuster 20 is conveyed through a line 25 to the nominal-value integrator 23, whose output signal is conveyed through a line 26 to the speed regulating element 27, to which the signal is conveyed through a line 28 to a movement signal transmitter 28a designed as a tachogenerator in the implementation example. The signals flowing through lines 26 and 28 to the speed regulating element 27 are compared in the latter and converted to an output signal that is fed through a line 29 to the rheostat 30.

An ammeter 31 is also located in the lines 5 in the implementation example; its output signal is also fed to the rheostat 30 through a line 32. The output signal of the rheostat 30 flows through a line 33 to a power regulating unit 34.

In the implementation example an engine r.p.m. signal transmitter 35 is also connected to the shaft 2 of the internal combustion engine 1; a signal is conveyed from it through line 36 to the comparison unit 37, to which the signal of the adjusting element signal transmitter 19 is also fed through line 38. The signals of the transmitters 19 and 35 are compared with each other and evaluated in the comparison unit 37. The output signal of the comparison unit 37 flows through line 39 to the power regulating element 34 also. The output signal of the latter flows through the line 40 to the final control element 41, which is connected through the line 42 and the switch 46 and the end stage 43 and the line 44 to the field winding 4 of the d.c. generator 3,4.

A branch line 45 branches off from the line 33 running between the rheostat 30 and the power regulating unit 34. It leads to a switch 46 that acts on the end stage 43 through the lines 47 and 48 as a function of the polarity of the signal present in line 33 and thus in line 45.

The slip ring of the transmitter 19 designed as a potentiometer is displaced proportionally to the swing angle of the lever 11, such that the transmitter 19 delivers a d.c. voltage signal proportional to the setting of the lever 11. The size of this d.c. voltage signal is a measure of the r.p.m. of the internal combustion engine 1 in the nonloaded state. The movement signal transmitter 35 driven by the internal combustion engine 1 furnishes a frequency proportional to the r.p.m. of the latter that is converted through a frequency voltage converter into a voltage, or it delivers a voltage directly. This voltage is a signal for the actual r.p.m. value of the internal combustion engine 1. The speed setting adjuster 15 is connected through a rod 14, 11 with the adjusting element of the internal combustion engine 1. A moveable stop 60 facilitates swinging the adjusting lever 11 toward the left in the drawing, independently of the speed setting adjuster 15.

The movement signal transmitter 28a delivers a signal corresponding to the actual value of the travel speed in the form of a d.c. voltage.

The nominal and actual values for the r.p.m. of the d.c. motor 6, 7 are compared with each other in the speed regulating unit 27. The final control element 41 serves to convert the output voltage of the power regulator 34 into a rectangular signal with a response time between zero and 100%.

The exciting current in the field winding 7 of the d.c. motor 6, 7 is controlled between 50 and 100% of the maximum current through the field current control unit 8 as a function of the size of the armature current flowing through the lines 5.

The following regulating process results: After selecting the travel direction by adjusting the travel direction transmitter 21, a theoretical speed value signal is transmitted through line 25 to the nominal-value integrator 23 from the signal transmitter 20 by actuating the theoretical speed value transmitter 15. If the rate of variation of the signal leaving the speed setting adjuster 20 and flowing through lines 25 is less than according to the program of the nominal-value integrator 23, this signal is immediately forwarded through line 26, but if the variation rate is greater, the signal is limited in accordance with the program of the nominal value or setpoint speed integrator 23. The output signal is transmitted to the speed regulating unit 27, which controls up fully as a result of a high amplification. The rheostat 30 and the power regulating unit 34 are likewise controlled up, so that the field winding 4 of the generator 3, 4 is excited through the end stage 43, with the result that a current begins to flow in the armature 3, the size of which is measured by the ammeter 31, whose measurement signal is conveyed to the rheostat 30. If the armature current value prescribed as the maximum value is reached, the rheostat 30 regulates the modulation of the end stage 43 back to the admissible value. If the r.p.m. of the internal combustion engine 1 drops due to an excessive load on it, the power regulating unit 34 takes over the control of the current flowing through the field winding 4 on the basis of the signal fed to it from the comparison unit 37 and regulates so that the internal combustion engine 1 is not overloaded.

After the nominal speed value prescribed by the setting of the speed setting adjuster 15 is reached, the speed regulating unit 27 takes control and maintains the desired r.p.m of the output shaft of the d.c. motor 6, 7, i.e., the desired travel speed. If the speed setting adjuster 15 is drawn back into a position corresponding to a slower nominal travel speed, the modulation of the speed regulating unit 27 is reversed since now the actual signal value furnished by the movement signal transmitter 29 is greater than the nominal signal value furnished by the transmitter 20. The rheostat or current regulating unit 30 is thus acted upon with an inverse nominal current value, which in turn furnishes a corresponding signal, which finally has the result, due to the corresponding modulation of the excitation through the field winding 4, that the armature current in the armature 3 of the generator and in the armature 6 of the d.c. motor is reversed.

The construction of the nominal-value integrator 23 is shown in detail in FIG. 2. The travel direction transmitter 21 and the transmitter 20 for the nominal speed value signal are coupled in a somewhat different manner in FIG. 2 than in FIG. 1. In connection with the present invention, however, this is insignificant.

The nominal-value integrator 23 has three amplifiers 51, 52, and 53, of which the amplifiers 51 and 53 are each return-coupled through resistances 54a and the amplifier 52 is return-coupled through a condenser 55. The amplifiers 51, 52, and 53 are connected to the line 50 departing from the voltage source 24. The signal departing from the transmitter 20 for the nominal speed value and possibly reversed in polarity or not reversed in polarity in the travel direction transmitter 21 is conveyed through a resistance 56 to the amplifier 51, from which the signal flows through an adjustable resistance 74, which is arbitrarily adjustable for preselecting the running time of the nominal-value integrator 23, through the line 57 and a resistance 58 to the amplifier 52, from which the line 26 leads to the speed regulating unit 27. In addition to the line 26, the output side of the amplifier 52 is also connected to a line 59, which leads through a resistance 60 to the amplifier 53, the output of which is connected through a line 61 and a resistance 62 again to the input of amplifier 51.

Line 26 is also connected to a line 62, which leads through a resistance 75 to the input of the control amplifier 70. A line 63 is connected to the line 28 leading from the movement signal transmitter 29 to the speed regulating unit 27; it also leads through a resistance 76 to the input of the control amplifier 70, which is return-coupled through a resistance 68. A line 64 is connected to the output of the control amplifier 70; it is in turn connected to the input of amplifier 51 through two opposite-connected diodes 71 and 72, which open only if a certain threshold value is exceeded, and remain closed if the threshold value is not reached, through a line 65 and a resistance 77.

The control amplifier 70 is controlled through the resistance 75 by the nominal-value signal flowing in line 26 and through the resistance 76 by the actual-value signal flowing in line 28. If the actual-value signal leaving the movement signal transmitter 29 matches the nominal-value signal flowing in line 26, the control amplifier 70 is not modulated and thus remains inoperative. The additional device 67 containing this control amplifier is connected and built onto the nominal-value integrator 23. If the speed setting adjuster 15 is actuated in a vehicle securely braked by a friction brake and thus a signal is transmitted from the speed signal value transmitter 20, a signal flows through the line 62 and the resistance 75 to the control amplifier 70, while on the other hand the voltage of the movement signal transmitter 29 is zero, so that only the signal in the line 26 and through this and the line 75a and the resistance 75 at the control amplifier 70 modulates it, i.e., so that the nominal speed value signal is reduced through the diodes 71, 72 through the line 65 and the resistance 77 and the amplifiers 51 and 52 in the line 26. The diodes 71 and 72 are dimensioned so that they open only if a certain threshold value is exceeded. Thus, they allow a difference between the nominal and the actual values so that a nominal-value excess persists in order to maintain the drive functional and operational, even though the nominal value is regulated back approximately to the actual value by the control amplifier when a difference develops between the nominal and actual values.

If the nominal-value integrator 23 has already run up high and the vehicle is then braked by a mechanical friction brake, the aforementioned engagement of the control amplifier 70 is too slow due to the time lag of the nominal-value integrator 23, i.e., the control amplifier 70 does not regulate the nominal value back sufficiently rapidly to reliably prevent the nominal travel speed value from being still greater than the actual travel speed when the brake is released and thus the already braked vehicle is again accelerated against the will of the operator and accordingly without actuation of the speed setting adjuster 15.

A shortening of the running time of the nominal-value integrator 23 offers a remedy here by reducing its time constant as a function of the action of the friction brake. For this purpose, two lines 81 and 82 are connected at the output of the amplifier 51 in front of and beyond the adjustable resistance 74 and then bridge over the latter if they are connected together by the switch 73. The switch 73 is in turn actuated by a pressure cylinder 83, which is connected through a branch line 84 to the brake pressure line (not shown in the drawing), from which the friction brake is acted upon. The voltage measured at the collector ring of the adjustable resistance 74 is a measure of the runup time or rundown time of the integrator 52. In the design shown in the drawing, the slip plot below signifies the longest lag time. When the switch 73 is closed, the voltage at the slip ring pickup is drawn closer through the line 81, switch 73, and line 82 to the voltage at the output of the amplifier 51. A higher voltage thus results in the line 57 and the programmed running time of the nominal-value integrator 23 is then shortened when the hydraulic brake is actuated and the contact 73 is thus closed.

A resistance 85 can be inserted in line 82. It can be arbitrarily adjustable. In a preferred implementation it is designed as a proportional control through the pressure pick-off of the pressure in the hydraulic brake line, so that the magnitude of the resistance is dependent on the pressure in the brake pressure line.

If the vehicle is braked in this implementation variant by actuating the mechanical friction brake, the contact 73 is simultaneously closed and thus the running time of the nominal-value integrator 23 is considerably shortened, so that when the brake is released the nominal speed value signal in line 26 has dropped so much that it is no longer higher than the actual travel speed. This means that if the vehicle is braked to a stop, the nominal speed value signal in line 26 is also controlled down to a zero value.

In the foregoing specification, I have set out certain preferred practices and embodiments of this invention, however, it will be understood that this invention may be otherwise embodied within the scope of the following claims.

I claim:

1. In a drive unit for a motor vehicle, such as an industrial truck and especially for a scoop loader, having an arbitrarily actuatable speed setting adjuster for adjusting the travel speed, an internal combustion engine wherein the speed setting adjuster is connected with a control signal transmitter and with a separately excited d.c.-current generator driven by the engine and with at least one d.c. motor that is separately excited and fed by the motorgenerator, a movement signal transmitting device that gives a signal that is dependent on the state of motion of the d.c. motor and wherein the signal of the control signal transmitter and the signal of the movement signal transmitting device are fed to a speed regulating unit, whose output signal is fed to a power regulating unit that controls the field excitation of the d.c. generator, and in which the signal of the control signal transmitter is conveyed through a nominal-value integrator, which in a delayed manner modifies the signal flowing to the speed regulating unit in accordance with a prescribed program, to the speed regulating unit when there are rapid changes in the signal of the control signal transmitter, the improvement comprising at least one means in the nominal-value integrator dependent upon an operating parameter of the motor vehicle which means acts upon and influences the delay program of the nominal-value integrator.

2. Drive unit according to claim 1, wherein the at least one means is a control amplifier acting on and influencing the nominal-value integrator when a difference develops between the signal of the speed nominal-value signal transmitter and the signal of the movement signal transmitter.

3. Drive unit according to claim 1, having an arbitrarily actuatable brake, a brake signaller connected with the brake, and the at least one means is an additional circuit receiving and acted upon by the signal of the brake signaller to effect a shortening of the running time of the nominal-value integrator.

4. A drive unit according to claim 3 wherein the nominal value integrator has first, second and third amplifiers in series and the at least one means bridges a resistance located at the outlet of the first amplifier.

5. Drive unit according to claim 2, wherein the control amplifier shortens the residual running time of the nominal-value integrator in the controlled state.

6. Drive unit according to claim 2, wherein a threshold-value circuit is switched in between the outlet of the control amplifier and the inlet of the nominal-value integrator.

7. Drive unit according to claim 1, characterized in that the operating parameter that influences the at least one means is the load on the driving axle.

8. A drive unit as claimed in claim 1 or 2 or 3 or 4 or 5 or 6 or 7 wherein the speed setting adjuster is a pedal.

9. A drive unit as claimed in claim 1 or 2 or 3 or 4 or 5 or 6 or 7 wherein the internal combustion engine is a Diesel engine.

* * * * *